US012122260B2

(12) United States Patent
Itai et al.

(10) Patent No.: US 12,122,260 B2
(45) Date of Patent: Oct. 22, 2024

(54) ARTICLE RECEIVING DEVICE AND ELECTRIC VEHICLE

(71) Applicant: HONDA MOTOR CO., LTD., Tokyo (JP)

(72) Inventors: Ryosuke Itai, Saitama (JP); Takero Shibukawa, Saitama (JP); Hidenori Azuma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 955 days.

(21) Appl. No.: 17/259,947

(22) PCT Filed: Jul. 2, 2019

(86) PCT No.: PCT/JP2019/026357
§ 371 (c)(1),
(2) Date: Jan. 13, 2021

(87) PCT Pub. No.: WO2020/017324
PCT Pub. Date: Jan. 23, 2020

(65) Prior Publication Data
US 2021/0313647 A1 Oct. 7, 2021

(30) Foreign Application Priority Data
Jul. 16, 2018 (JP) .................................. 2018-133784

(51) Int. Cl.
*H01M 50/249* (2021.01)
*B60L 53/80* (2019.01)
(Continued)

(52) U.S. Cl.
CPC ........... *B60L 53/80* (2019.02); *H01M 50/209* (2021.01); *H01M 50/244* (2021.01);
(Continued)

(58) Field of Classification Search
CPC . B60K 1/04; B60L 50/64; B60L 50/66; B60L 53/80; B62D 21/00; H01M 2220/20;
(Continued)

(56) References Cited

U.S. PATENT DOCUMENTS 5,477,936 A 12/1995 Sugioka et al.
6,056,077 A 5/2000 Kobayashi
(Continued)

FOREIGN PATENT DOCUMENTS

JP  S4937910 U  4/1974
JP  H10203459 A  8/1998
(Continued)

OTHER PUBLICATIONS

Examination Report received for Patent Application IN 202147005629 dated Sep. 27, 2021; 6 pp.
(Continued)

*Primary Examiner* — Lingwen R Zeng
(74) *Attorney, Agent, or Firm* — Armstrong Teasdale LLP

(57) ABSTRACT

Provided is an article receiving device that allows an article to be put into and taken out of an article receiving portion without causing any undue burden on the body of the user. The article receiving device (30) for receiving an article (200) therein, comprises a receiving portion (48) having an opening (60) for passing the article into and out of the receiving portion, and a lid (70) rotatable around an axial line extending horizontally along a lower part of the opening to selectively open and close the opening, wherein the lid is provided with a lid side guide portion (98) extending across the axial line and toward a side of the receiving portion with respect to a rotational direction of the lid around the axial line.

16 Claims, 14 Drawing Sheets

(51) Int. Cl.
*H01M 50/209* (2021.01)
*H01M 50/244* (2021.01)
*H01M 50/262* (2021.01)
*H01M 50/264* (2021.01)
*H01M 50/271* (2021.01)
*B60L 50/60* (2019.01)
*B60L 50/64* (2019.01)
*B62D 21/00* (2006.01)

(52) U.S. Cl.
CPC ....... *H01M 50/249* (2021.01); *H01M 50/262* (2021.01); *H01M 50/264* (2021.01); *H01M 50/271* (2021.01); *B60L 50/64* (2019.02); *B60L 50/66* (2019.02); *B62D 21/00* (2013.01); *H01M 2220/20* (2013.01); *Y02E 60/10* (2013.01); *Y02T 10/70* (2013.01); *Y02T 10/7072* (2013.01)

(58) Field of Classification Search
CPC ............. H01M 50/209; H01M 50/244; H01M 50/249; H01M 50/262; H01M 50/264; H01M 50/271; Y02E 60/10; Y02T 10/70; Y02T 10/7072
See application file for complete search history.

(56) References Cited

U.S. PATENT DOCUMENTS

2009/0291358 A1   11/2009   Boegelein et al.
2017/0106733 A1*   4/2017   Tsuji .................. B60R 5/04

FOREIGN PATENT DOCUMENTS

| JP | 2011000913 A | 1/2011 |
| JP | 5907779 B2 | 4/2016 |
| JP | 2017137002 A | 8/2017 |
| WO | 2017022342 A1 | 2/2017 |
| WO | 2017022394 A1 | 2/2017 |

OTHER PUBLICATIONS

English translation of International Search Report for JP Application PCT/JP2019/026357 mailed Oct. 8, 2019; 2 pp.

* cited by examiner

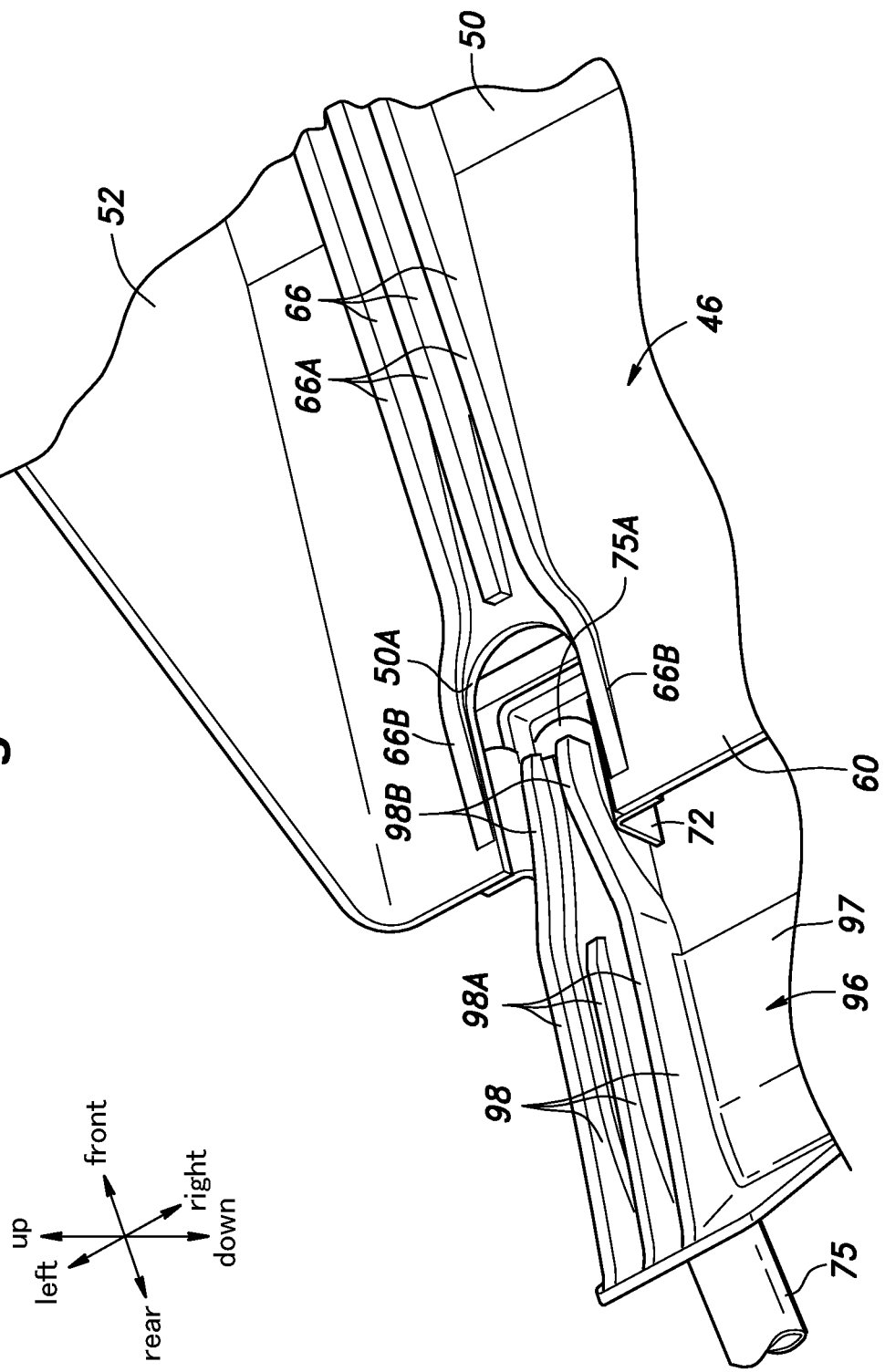

ARTICLE RECEIVING DEVICE AND ELECTRIC VEHICLE

CROSS-REFERENCE TO RELATED APPLICATIONS

This application is a U.S. National Phase Application of PCT/JP2019/026357, filed Jul. 2, 2019, which claims the benefit of priority to Japanese Patent Application No. 2018-133784, filed Jul. 16, 2018, the contents of which are hereby expressly incorporated by reference in their entirety.

TECHNICAL FIELD

The present invention relates to an article receiving device and an electric vehicle, and more particularly, to an article receiving device that allows articles such as a battery pack to be received and released, and an electric vehicle fitted with such an article receiving device.

BACKGROUND OF THE INVENTION

A known electric vehicle is provided with a battery receiving device for a portable battery pack (secondary battery) that allows the battery pack to be received and released by a user (see Patent Documents 1, 2, and 3, for instance).

PRIOR ART DOCUMENT(S)

Patent Document(s)

Patent Document 1: JPH10-203459A
Patent Document 2: WO2017/022394A1
Patent Document 3: JP2017-137002A

SUMMARY OF THE INVENTION

Task to be Accomplished by the Invention

Even though the battery pack is a relatively heavy object, the operator has to manually put and take the battery pack into and out of the battery receiving device. Thus, there is a desire that the work in putting and taking an article such as a battery pack into and out of an article receiving device such as a battery receiving device be performed without causing any undue burden on the hip and knees of the user.

A primary object of the present invention is to provide an article receiving device such as a battery receiving device that allows an article such as a battery pack to be put into and taken out of the article receiving device without causing any undue burden on the hip and knees of the user.

Means to Accomplish the Task

To achieve such an object, the present invention provides an article receiving device (30) for receiving an article (200) therein, comprising: a receiving portion (48) configured to receive the article therein, and having an opening (60) for passing the article into and out of the receiving portion; and a lid (70, 100) rotatable around an axial line extending horizontally along a lower part of the opening to electively open and close the opening: wherein the lid is provided with a lid side guide portion (98, 107, 108, 128) extending across the axial line and toward a side of the receiving portion with respect to a rotational direction of the lid around the axial line.

Thus, the article can be put into and taken out of the receiving portion in an efficient manner without causing any undue burden on the body of the user. The direction extending across the axial line or the extending direction of the lid side guide portion may coincide with the direction along which the article is put into and taken out of the receiving portion when the lid is in the open position.

Preferably, this article receiving device further comprises an engaging portion (68, 140) configured to selectively retain the lid in an open position, the lid side guide portion having an upper surface (98A) which slopes downward toward the opening when the lid is in the open position.

Thereby, the article can be put into and taken out of the receiving portion in a smooth and efficient manner without requiring a large force.

Preferably, this article receiving device further comprises a receiving member (46) that defines the receiving portion, and an engaging portion (68, 140) configured to selectively retain the lid in an open position, wherein the lid side guide portion includes a ridge extending in a direction along which the article is put into and taken out of the receiving portion when the lid is in the open position.

Thereby, the article can be put into and taken out of the receiving portion in a smooth and efficient manner by using a simple structure 4.

In this article receiving device, preferably, the lid has a surface portion (4, 122A) from which the ridge projects.

Thereby, the mechanical strength of the lid (70, 100) is improved.

In this article receiving device, preferably, the lid side guide portion includes a plurality of rolling members (129) arranged in a direction along which the article is put into and taken out of the receiving portion.

Thereby, the article can be put into and out of the receiving portion in an even more smooth and efficient manner.

In this article receiving device, preferably, the receiving device further comprises a receiving member (46) that defines the receiving portion, the receiving member being provided with a receiving portion side guide portion (66) formed so as to extend across the axial line.

Thereby, the article can be put into and taken out of the receiving portion in an efficient manner. The direction extending across the axial line or the extending direction of the lid side guide portion may coincide with the direction along which the article is put into and taken out of the receiving portion.

In this article receiving device, preferably, the receiving portion side guide portion extends substantially horizontally.

Thereby, the article can be put into and taken out of the receiving portion in a smooth and efficient manner without requiring a large force.

Preferably, this article receiving device further comprises an engaging portion (68, 140) configured to selectively retain the lid in an open position, and the lid side guide portion and the receiving portion side guide portion are provided with mutually overlapping portions when the lid is in an open position.

Thereby, the article can be passed between the receiving portion side guide portion and the lid side guide portion with a continuity and in a smooth manner.

Preferably, this article receiving device further comprises a lid locking device (82, 84, 86, 112, 116) configured to releasably lock the lid in a closed position.

Thereby, the lid (70) is prevented from inadvertently opening so that the article (200) is prevented from inadvertently falling off from the receiving portion.

In this article receiving device, preferably, the lid (70) is provided with an abutting portion (90, 110) that resiliently abuts against the article (200) received in the receiving portion (48) when the lid (70) is in the closed position.

Thereby, the article (200) received in the receiving portion (48) is prevented from rattling due to vibrations or the likes.

Preferably, the article receiving device further comprises an engaging portion (68) configured to selectively retain the lid in an open position, wherein the lid includes a first portion (75A) located on a base end part thereof and provided with a lid side guide portion, and a second portion (75B) located on a free end part thereof and provided with the abutting portion, the first portion and the second portion being bent relative to each other so that a free end of the abutting portion is located below an imaginary plane (L) containing the upper surface of the lid side guide portion of the lid when the lid is in the closed position.

Thereby, the article can be put into and taken out of the receiving portion in a smooth manner without being obstructed by the abutting portion.

Preferably, the article receiving device further comprises an engaging portion (140) configured to selectively retain the lid in an open position, wherein the lid includes a main body portion (104) provided with the abutting portion and an auxiliary portion (122) provided with the lid side guide portion and rotatable around an axial line parallel to the aforementioned axial line relative to the main body portion, the main body portion and the auxiliary portion being connected to each other so that the abutting portion projects toward the receiving member more than the lid side guide portion when the lid is in the closed position, and the lid side guide portion projects toward the receiving member more than the abutting portion when the lid is in the open position.

Thereby, the article can be put into and taken out of the receiving portion in a smooth manner without being obstructed by the abutting portion.

In this article receiving device, preferably, the main body portion and the auxiliary portion are connected to each other by a pin (124) provided on the main body portion and a slot (126) provided in the auxiliary portion to receive the pin therein so that a relative rotation between the main body portion and the auxiliary portion is limited within a prescribed rotational angular range.

Thereby, the main body portion and the auxiliary portion can be connected to each other in an appropriate manner with a simple structure.

In this article receiving device (30), preferably, the lid (70) is provided with an article engaging portion (94) that detachably engages the article received in the receiving portion to secure the article to the lid (70) when the lid is in the closed position.

Thereby, the article can be retained in the receiving portion in a highly reliable manner.

In this article receiving device, preferably, the receiving portion includes a ceiling wall (57) defining a ceiling surface (58) of the receiving portion (48), the ceiling surface being inclined upward relative to a bottom surface of the receiving portion from a part of the receiving portion remote from the opening toward the opening in a direction along which the article is put into and taken out of the receiving portion.

Thereby, the article can be put into and taken out of the receiving portion in an efficient manner without being obstructed by the ceiling of the receiving member.

Preferably, this article receiving device further includes a pair of side walls (51, 53) forming a left and a right side surface (52, 54) of the receiving portion (48), and a pair of extension walls (59, 61) extending from the respective side walls to either side of the lid (70).

Thus, the extension walls serve as a lateral guide for the article that is received in the receiving portion.

In the article receiving device, preferably, the article is a battery pack (200).

Thereby, the battery pack can be put into and out of the receiving portion in an efficient manner.

An electric vehicle provided as an embodiment of the present invention is fitted with the article receiving device defined above.

Thereby, the battery pack can be put into and out of the receiving portion of the electric vehicle in an efficient manner.

The present invention provides as another embodiment thereof an electric vehicle having a battery pack (100) detachably mounted on a vehicle body (12) thereof, comprising: a battery receiving member (46) having an opening (60) for the battery pack (200) and defining a battery receiving portion (48) configured to receive the battery pack (100) therein so as to be put into and taken out, and a lid (70, 100) rotatable around an axial line extending horizontally along a lower part of the opening (60) to selectively open and close the opening (60); wherein the battery receiving member (46) includes a bottom wall (49) defining a bottom surface (50) of the battery receiving portion (48), and a receiving portion side guide portion (66) consisting of a ridge extending on the bottom surface in a direction along which the battery pack (200) is put into and taken out and having an upper surface (66A) along which the battery pack (200) slides, and wherein the lid (70) is configured to be selectively retained at an open position for exposing the opening (60), and is provided with a lid side guide portion (98) consisting of a ridge that inclines downward from a part of the lid (70) remote from the opening (60) toward the bottom surface (50) and having an upper surface (98A) along which the battery pack (200) slides.

Thereby, the battery pack (200) can be put into and taken out of the battery receiving member (46) in an efficient manner without causing a large burden on the body of the user.

In this electric vehicle, preferably, the receiving portion side guide portion (66) extends substantially horizontally.

Thereby, the battery pack can be put into and taken out of the battery receiving portion in a smooth and efficient manner without requiring a large force.

In this electric vehicle, preferably, the receiving portion side guide portion (66) and the lid side guide portion (98) include mutually overlapping portions in a direction along which the battery pack is put into and taken out.

Thereby, the battery pack (200) can be passed between the receiving portion side guide portion and the lid side guide portion with a continuity and in a smooth manner.

In this electric vehicle, preferably, the battery receiving member (46) further includes a pair of side walls (51, 53) defining a right and a left side surface (52, 54) of the battery receiving portion (48), respectively, and a pair of extension walls (59, 61) extending from the respective side walls (51, 53) along either side of the lid (70) at the closed position.

Thus, the extension walls serve as a lateral guide for the battery pack (200) that is received in the battery receiving portion (48).

In this electric vehicle, preferably, the battery receiving member (46) includes a ceiling wall (57) forming a ceiling surface (58) of the battery receiving portion (48), the ceiling surface being inclined upward relative to a bottom surface (50) of the receiving portion (48) from a part of the receiving portion (48) remote from the opening (60) toward the opening (60) in a direction along which the battery pack is put into and taken out of the receiving portion (48).

Thereby, the battery pack (200) can be put into and taken out of the battery receiving portion (48) in an efficient manner without being obstructed by the ceiling of the battery receiving member (46).

Preferably, this electric vehicle further comprises a lid locking device (82, 84, 86) configured to releasably lock the lid (70) at the closed position with respect to the battery receiving member (46).

Thereby, the lid (70) is prevented from inadvertently opening so that the battery pack (200) is prevented from inadvertently falling off from the receiving portion.

In this electric vehicle, preferably, the lid (70) is provided with a battery engaging portion (94) that detachably engage the battery pack (200) received in the battery receiving portion (48) to secure the battery pack (200) to the lid (70) when the lid (70) closes the opening (60).

Thereby, the battery pack (200) can be retained in the battery receiving portion (48) in a highly reliable manner.

In this electric vehicle, preferably, the lid (70) is provided with an abutting portion (90, 110) made of rubber that resiliently abuts against the battery pack (200) received in the battery receiving portion (48) in the direction along which the battery pack (200) is put into and taken out of the battery receiving portion (48).

Thereby, the battery pack (200) received in the battery receiving portion (48) is prevented from rattling due to vibrations or the likes.

Effect of the Invention

Thus, the present invention provides an article receiving device that allows an article to be put into and taken out of an article receiving portion without causing any undue burden on the body of the user.

BRIEF DESCRIPTION OF THE DRAWINGS

FIG. 6 is an enlarged perspective view of a slide guide portion of the battery receiving device;

DETAILED DESCRIPTION OF THE PREFERRED EMBODIMENT(S)

An electric vehicle fitted with an article receiving device consisting of a battery receiving device according to an embodiment of the present invention is described in the following with reference to FIGS. 1 to 7.

Figure 1:
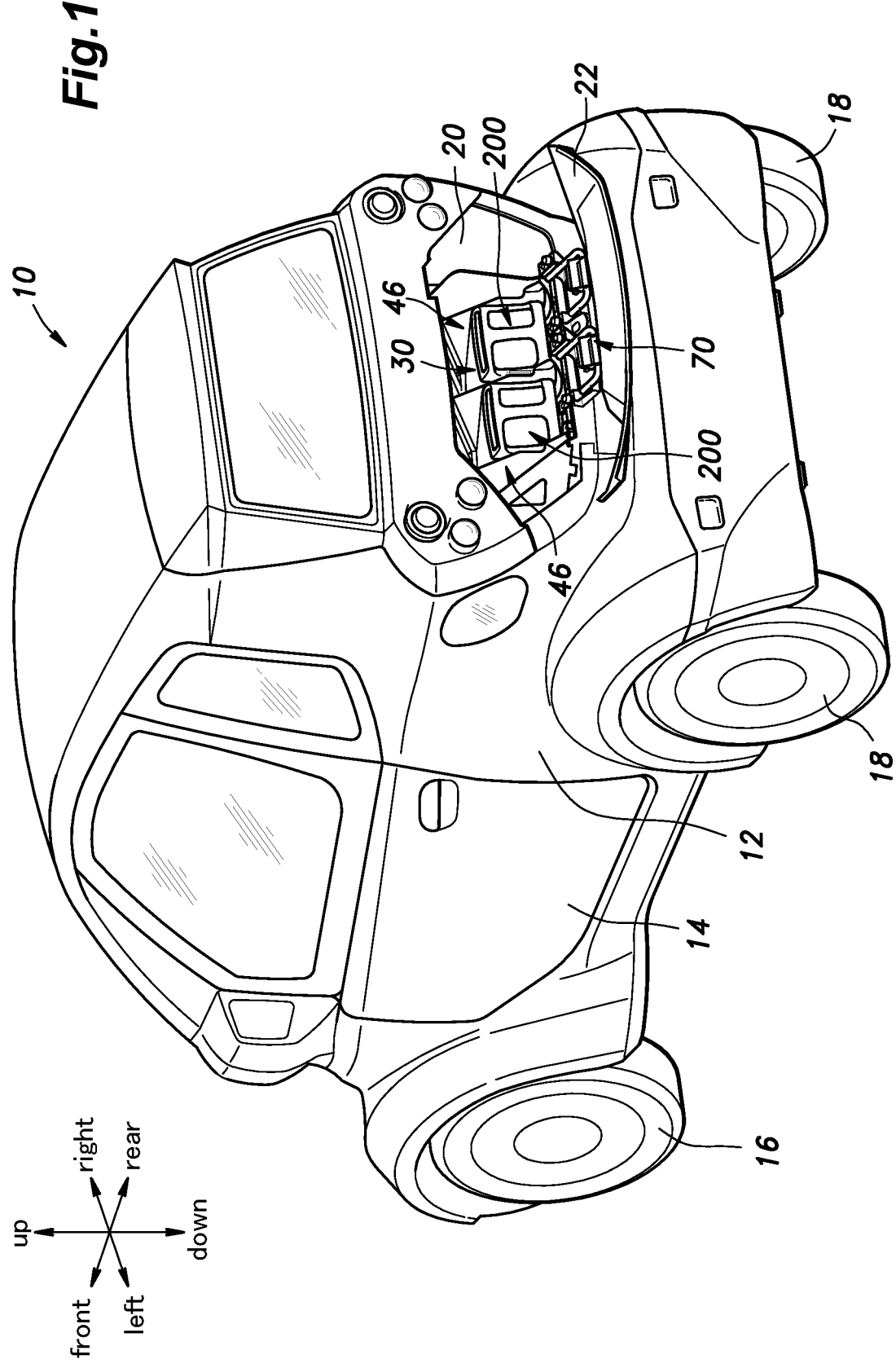
FIG. 1 is a perspective view of an electric vehicle fitted with an article receiving device consisting of a battery receiving device according to an embodiment of the present invention.

As shown in FIG. 1, the electric vehicle 10 is provided with a vehicle body 12, a door 14 mounted to the vehicle body 12, a pair of front wheels 16, and a pair of rear wheels 18, and an electric motor (not shown in the drawings) mounted on the vehicle body 12 to rotationally drive the front wheels 16 or the rear wheels 18.

A rear part of the vehicle body 12 is provided with a battery chamber 20 which is open on the rear side thereof, and a rear lid 22 that selectively opens and closes the battery chamber 20 by rotating around a horizontal axial line at the lower edge thereof.

A battery receiving device (article receiving device) 30 is provided in the battery chamber 20. The details of the battery receiving device 30 are described in the following with reference to FIGS. 2 to 7. The fore and aft direction, the left-right direction, and the up-down direction of the battery receiving device 30 are defined as mounted on the vehicle and as indicated in the drawings.

The battery receiving device 30 is provided with a mount member 32 fixed to the vehicle body 12. The mount member 32 includes a pair of end plates 34 located on either lateral side, an intermediate plate 36 positioned between the left and right end plates 34, four pipe frames 38 arranged between the left and right end plates 34 at regular intervals, and a plurality of laterally extending cross members 40, 42, 44 connecting the end plates 34, the intermediate plate 36, and the pipe frames 38 to one another.

A pair of box-shaped battery receiving members 46 are attached to the mount member 32 laterally one next to each other. Each battery receiving member 46 defines a battery receiving portion 48 (battery receiving chamber) for receiving a rectangular, box-shaped battery pack 200 therein. Each battery receiving member 46 includes a bottom wall 49, a pair of side walls 51, 53, a front wall 55, which define a bottom surface 50, side surfaces 52, 54, a front surface 56 (rear surface), and a ceiling surface 58 of the battery receiving portion 48, respectively. The battery receiving portion 48 is open at the rear end thereof, or more specifically, the rear end of the battery receiving portion 48 defines a rectangular opening 60 for allowing the battery pack 200 to be put into and taken out of the battery receiving portion 48. The openings 60 are positioned generally below the waist of a standing person.

The bottom surface 50 of the battery receiving portion 48 consists of a horizontal surface. The left and right side surfaces 52 and 54 are vertical surfaces rising from the left and right edges of the bottom surface 50, respectively. The ceiling surface 58 is an inclined surface that is inclined upward relative to the bottom surface 50 (in a direction along which the battery pack 200 is put into and out of the battery receiving portion 48) from a part of the battery receiving portion 48 remote from the opening 60 or, in other words, from the front surface 56 toward the opening 60. The rear edges of the side surfaces 52 and 54 defining the left and right sides of the opening 60, respectively, are inclined so as to move rearward as one moves downward from the ceiling surface 58 to the bottom surface 50. Due to this inclination, the rear end of the ceiling surface 58 is located ahead of the rear end of the bottom surface 50 so that no part of the ceiling surface 58 exists above the part of the bottom surface 50 located adjacent to the opening 60. Thus, the part of the bottom surface 50 located adjacent to the opening 60 defines a shelf surface having an open top.

The battery receiving member 46 is provided with a pair of extension walls 59 and 61 extending along either side of the base end of the lid 70 around which the lid 70 rotates.

The battery pack 200 consists of a portable type battery pack that can be carried by a user, and can be removed from the battery receiving portion 48 for recharging or the like. The battery pack 200 can be put into and taken out of the battery receiving portion 48 by a horizontal, fore and aft movement of the battery pack 200 relative to the battery receiving member 46.

Each battery receiving member 46 is fitted with an electric connector 64 (see FIG. 4) including terminals 62 projecting from the front surface 56 toward the battery receiving portion 48. The electric connector 64 is connected to a corresponding electric connector (not shown in the drawings) provided on the battery pack 200.

The bottom surface 50 is formed with a pair of receiving portion side guide portions 66 on either lateral side part thereof, each receiving portion side guide portion 66 being formed by three linear protrusions or three ridges extending in a direction crossing a hinge axial line which will be described hereinafter. Thus, the receiving portion side guide portion 66 extends horizontally in a direction (the fore and aft direction) along which the battery pack 200 is put into and taken out of the battery receiving portion 48. The receiving portion side guide portion 66 defines a band-shaped, horizontal upper surface 66A on which the battery pack 200 is to be placed. The upper surface 66A serves not only as a mounting surface for the battery pack 200 to sit on, but also as a sliding guide surface on which the battery pack 200 slides when the battery pack 200 is put into and taken out of the battery receiving portion 48.

Since the receiving portion side guide portion 66 guides the sliding motion of the battery pack 200, the battery pack 200 can be moved into and out of the battery receiving portion 48 with a relatively small contact area and a low friction so that the effort required for moving the battery pack 200 into and out of the battery receiving portion 48 is minimized.

The mount member 32 further includes another cross member 68. The cross member 68 extends in the lateral direction, and is joined to the end plates 34, the intermediate plate 36, and the rear ends of the pipe frames 38, as well as to a lower bottom portions of the two battery receiving members 46 adjacent to the respective openings 60. A pair of hinge brackets 72 are attached to the cross member 68. The hinge brackets 72 rotatably supports the lid 70 each with a hinge shaft 80.

Figure 4:
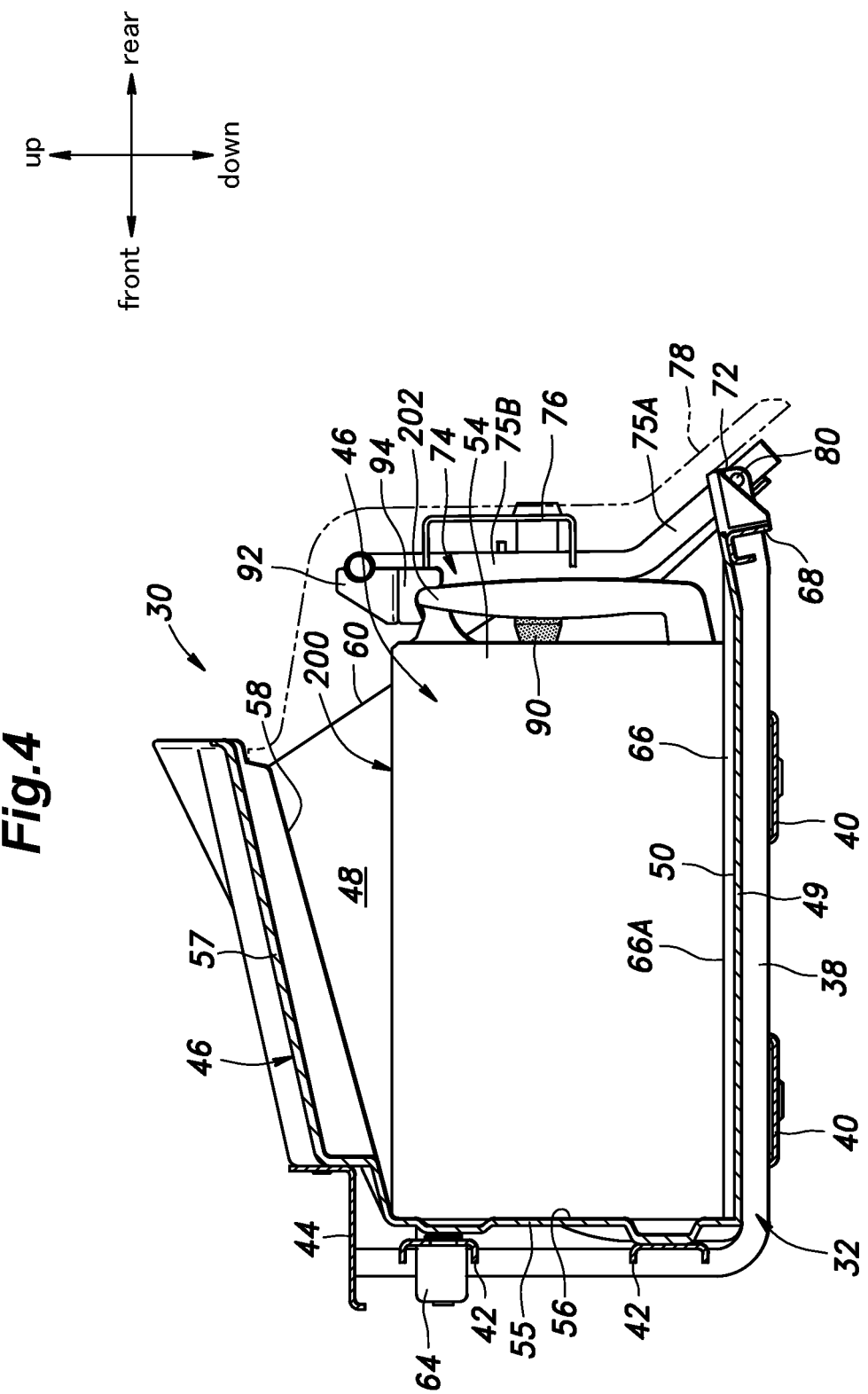
FIG. 4 is a vertical sectional view of the battery receiving device with the lid in the closed state.
Figure 5:
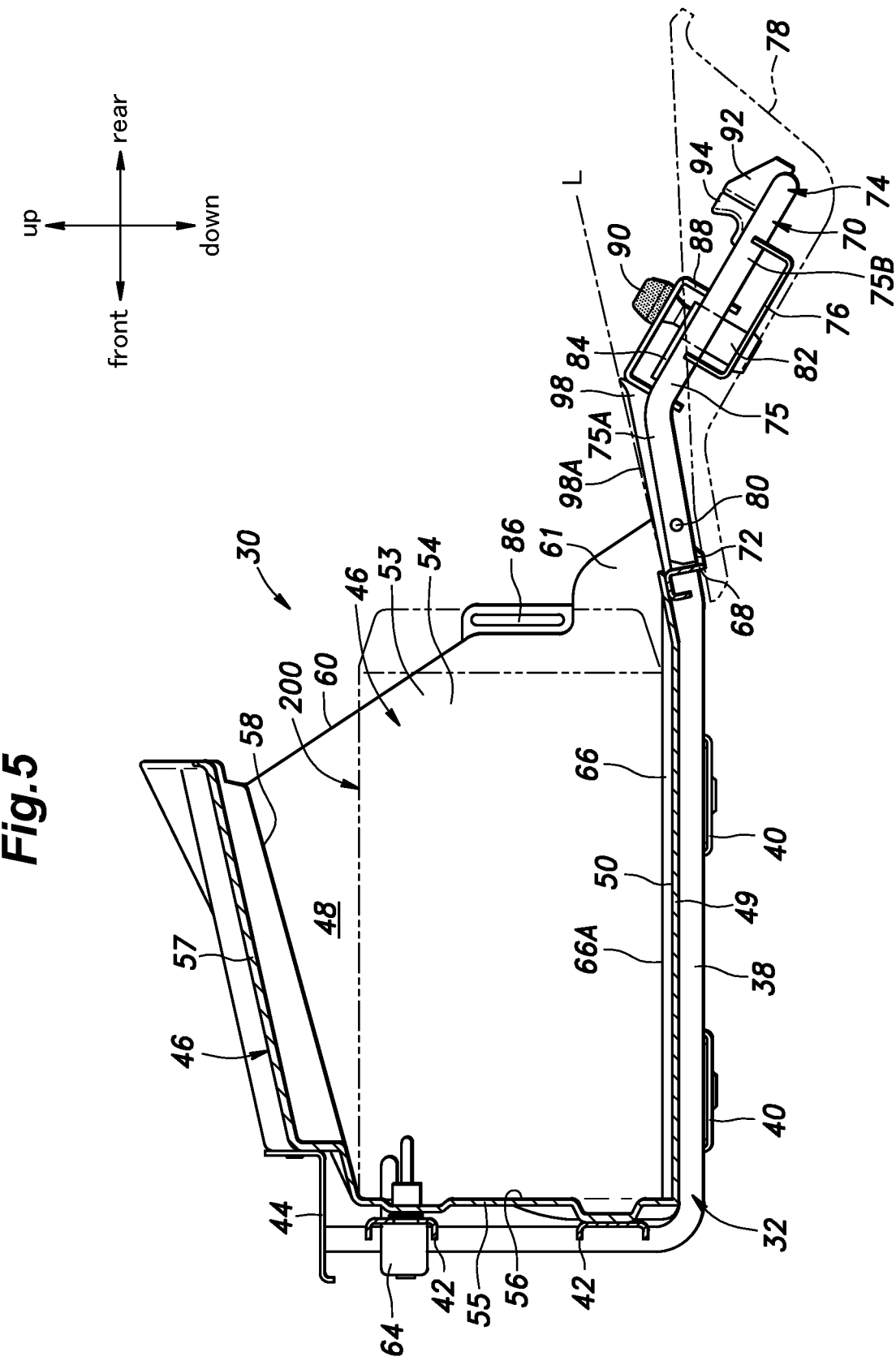
FIG. 5 is a vertical sectional view of the battery receiving device with the lid in the open state.

The lid 70 includes a pair of staple-shaped (gate-shaped) pipe members 74 each including a pair of leg portions 75 located on either side thereof so as to correspond to the respective battery receiving members 46, a connecting plate 76 that joins the staple-shaped pipe members 74 to each other so as to be next to each other, and an outer cover 78 (see FIGS. 4 and 5). The pipe frames 38 mentioned earlier are laterally arranged at positions corresponding to the respective leg portions 75 of the staple-shaped pipe members 74.

The hinge brackets 72 are provided so as to correspond to the respective leg portions 75 of the pipe members 74, and the free end part of each leg portion 75 is interposed between parts of the corresponding hinge bracket 72 from either side. Each hinge bracket 72 is provided with an individual hinge shaft 80 extending laterally (the right and left direction) in a lower part of the opening 60, or horizontally along a lower edge of the opening 60, and is passed through the corresponding hinge bracket 72 and the free end part of corresponding leg portions 75. As a result, the hinge shafts 80 support the lid 70 so as to be rotatable around a horizontal axial line X (see FIGS. 2 and 3) extending in the lateral direction.

Figure 2:
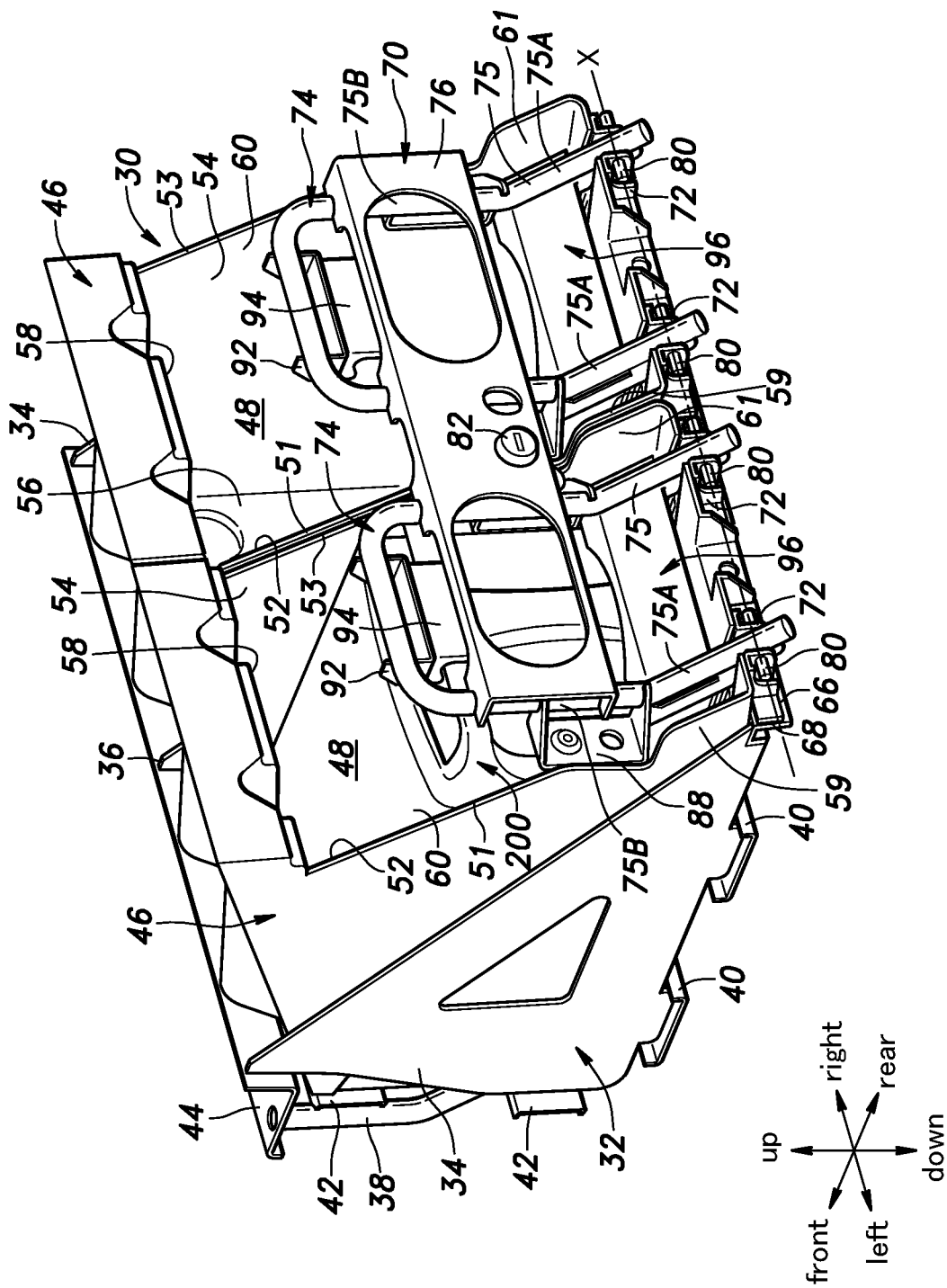
FIG. 2 is a perspective view of the battery receiving device of the present embodiment with a lid in the closed state.

As shown in FIGS. 2 and 4, the lid 70 is rotatable between a closed position at which the lid 70 stands upright in front of the openings 60 of the battery receiving members 46 and closes the openings 60, and an open position at which the lid 70 lies flat in front of the openings 60 of the battery receiving members 46 and opens the openings 60. As shown in FIG. 5, in the closed position, the lid 70 is prevented from rotating any further (downward) and kept closed owing to the abutting of the outer cover 78 against the cross member 68 serving as an engaging portion. The closed position of the lid 70 is an angular position of the lid 70 at which the lid 70 is prevented from rotating downward.

Figure 3:
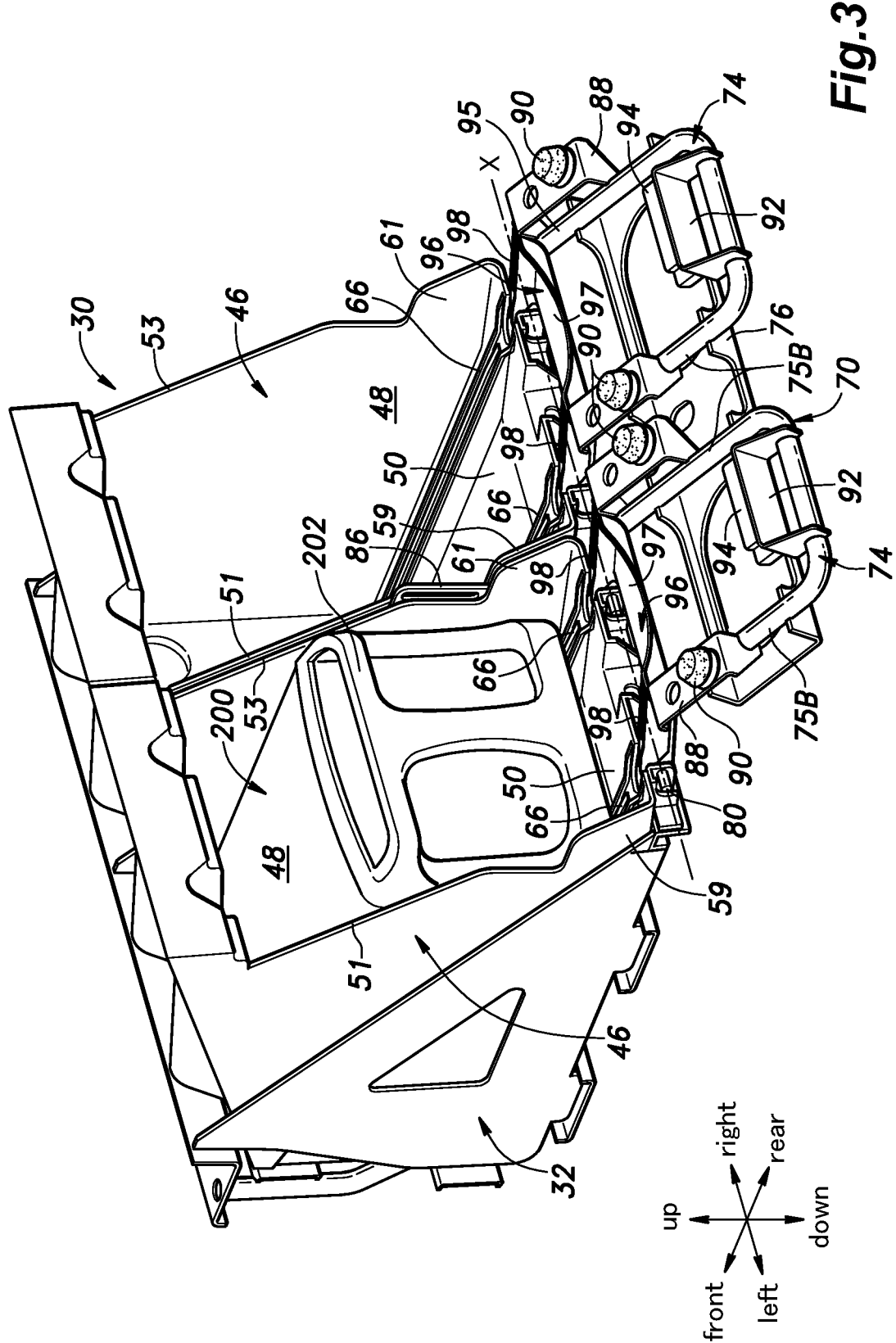
FIG. 3 is a perspective view of the battery receiving device with the lid in the open state.

As shown in FIGS. 3 and 5, the leg portions 75 of the pipe members 74 are each provided with a first portion 75A located in a base end part thereof and inclining downward from a part of the leg portion 75 remote from the base end thereof toward the bottom surface 50 in the open position of the lid 70, and a second portion 75B extending rearward from the part of the first portion 75A remote from the base end part thereof with a downward incline, again, in the open position of the lid 70. Thus, each leg portion 75 is bent in a chevron shape in side view. As shown in FIGS. 2 and 4, the second portion 75B stands substantially vertically upright when the lid 70 is in the closed position. A desirable bend between the first portion 75A and the second portion 75B will be discussed hereinafter.

A plate-like guide member 96 is attached to each pipe member 74 so as to connect the left and right first portions 75A of the pipe member 74 to each other. The guide member 96 is formed with a pair of lid side guide portions 98 in a laterally spaced relationship on a surface portion 97 of the lid 70 that faces upward in the open position of the lid 70 or that faces the battery receiving member 46 when the lid 70 is being rotated, and each lid side guide portion 98 includes three ridges (linear protrusions) projecting from the surface portion 97 and extending across the horizontal axial line X or in a direction (the fore and aft direction) along which the battery pack 200 is moved into and out of the battery receiving member 46. Thus, the left and right first portions 75A of each pipe member 74 are located closer to the rotational base end than the corresponding second portions 75B, and has the guide member 96 formed with the lid side guide portions 98.

Each lid side guide portion 98 defines an upper surface 98A that is inclined downward from the part thereof remote from the opening 60 toward the bottom surface 50 of the battery receiving portion 48 with respect to the bottom surface 50 when the lid 70 is in the open position. The upper surface 98A forms a sliding guide surface on which the battery pack 200 slides when the battery pack 200 is put into and taken out of the battery receiving portion 48.

The lid side guide portion 98 projecting from the surface portion 97 also acts as a reinforcing rib that increases the mechanical strength of the guide member 96.

The inclination angle of the upper surface 98A with respect to the horizontal plane when the lid 70 is in the open position may be 10 to 20 degrees, preferably about 15 degrees. This inclination angle may be the same as the inclination angle of the ceiling surface 58. In other words, the inclination angle of the ceiling surface 58 may be the same as the inclination angle of the upper surface 98A.

As shown in FIG. 6, an edge part of the bottom surface 50 of the battery receiving portion 48 on the side of the opening 60 corresponding to each housing side guide portion 66 is provided with a cutout 50A. A rear end portion 66B of each receiving portion side guide portion 66 include a pair of parts extending along either side edge of the cutout 50A in the fore and aft direction. A front end portion 98B of each lid side guide portion 98 includes a part that extends into the cutout 50A in the fore and aft direction when the lid 70 is in the open position.

Thus, the rear end portion 66B of the housing side guide portion 66 and the front end portion 98B of the lid side guide portion 98 include mutually overlapping parts in the direction (the fore and aft direction) along which the battery pack 200 is moved into and out of the battery receiving portion 48 when the lid 70 is in the open position. Further, the upper surface 66A of the rear end portion 66B and the upper surface 98A of the front end portion 98B are continuous in the moving direction of the battery pack 200 without any vertical step when the lid 70 is in the open position.

Figure 7A:
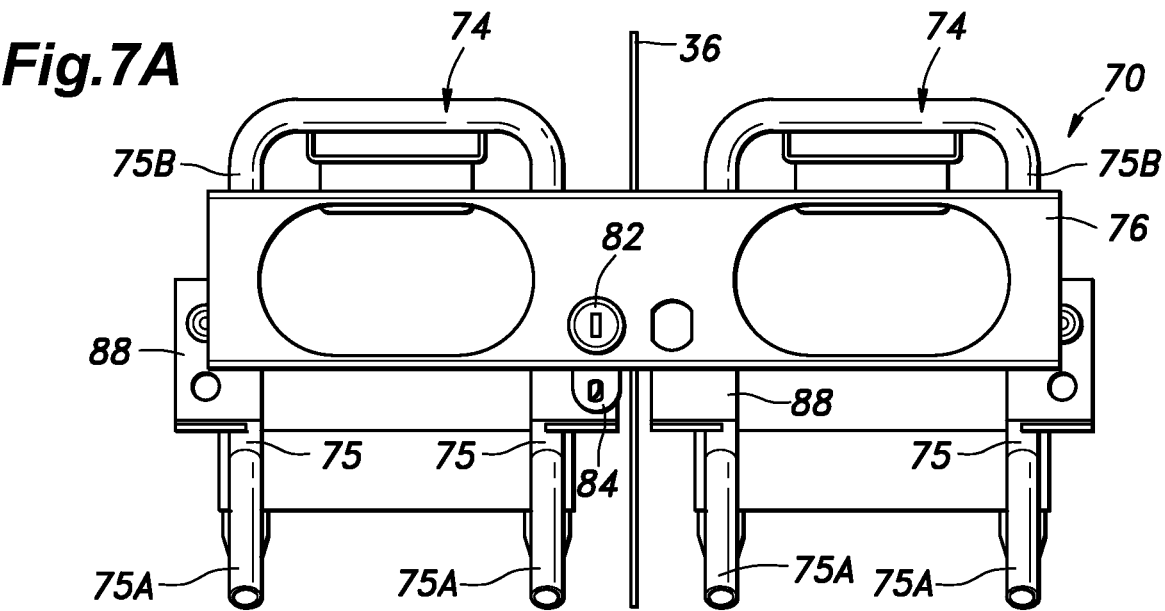
FIG. 7A is a vertical sectional view of a lid locking device of the battery receiving device in an unlocked state.
Figure 7B:
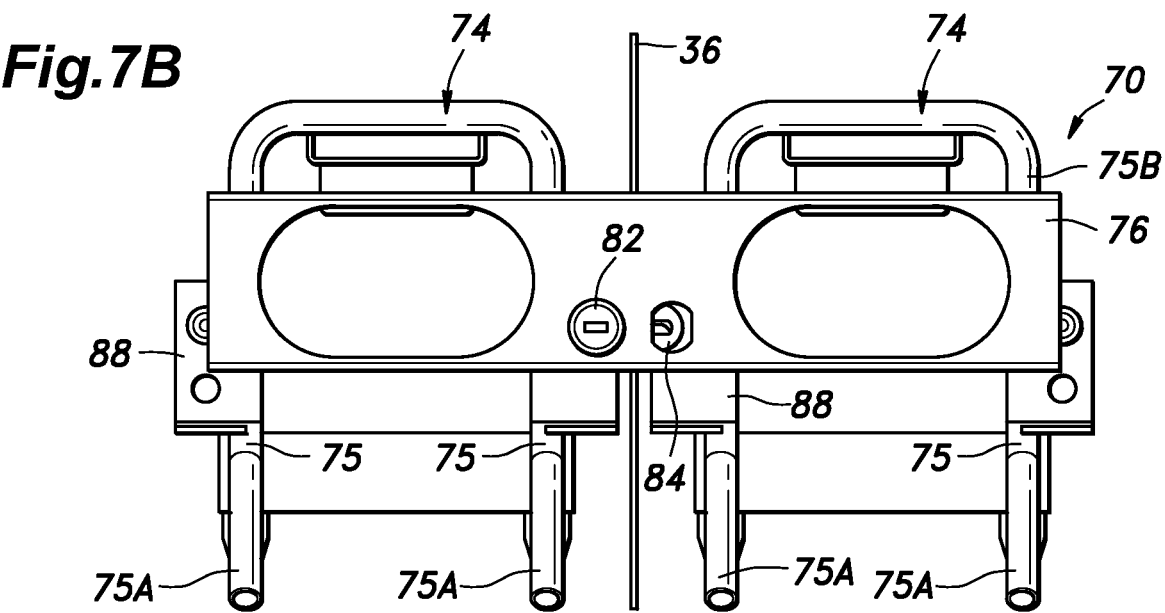
FIG. 7B is a vertical sectional view of the lid locking device of the battery receiving device in a locked state.
Figure 8:
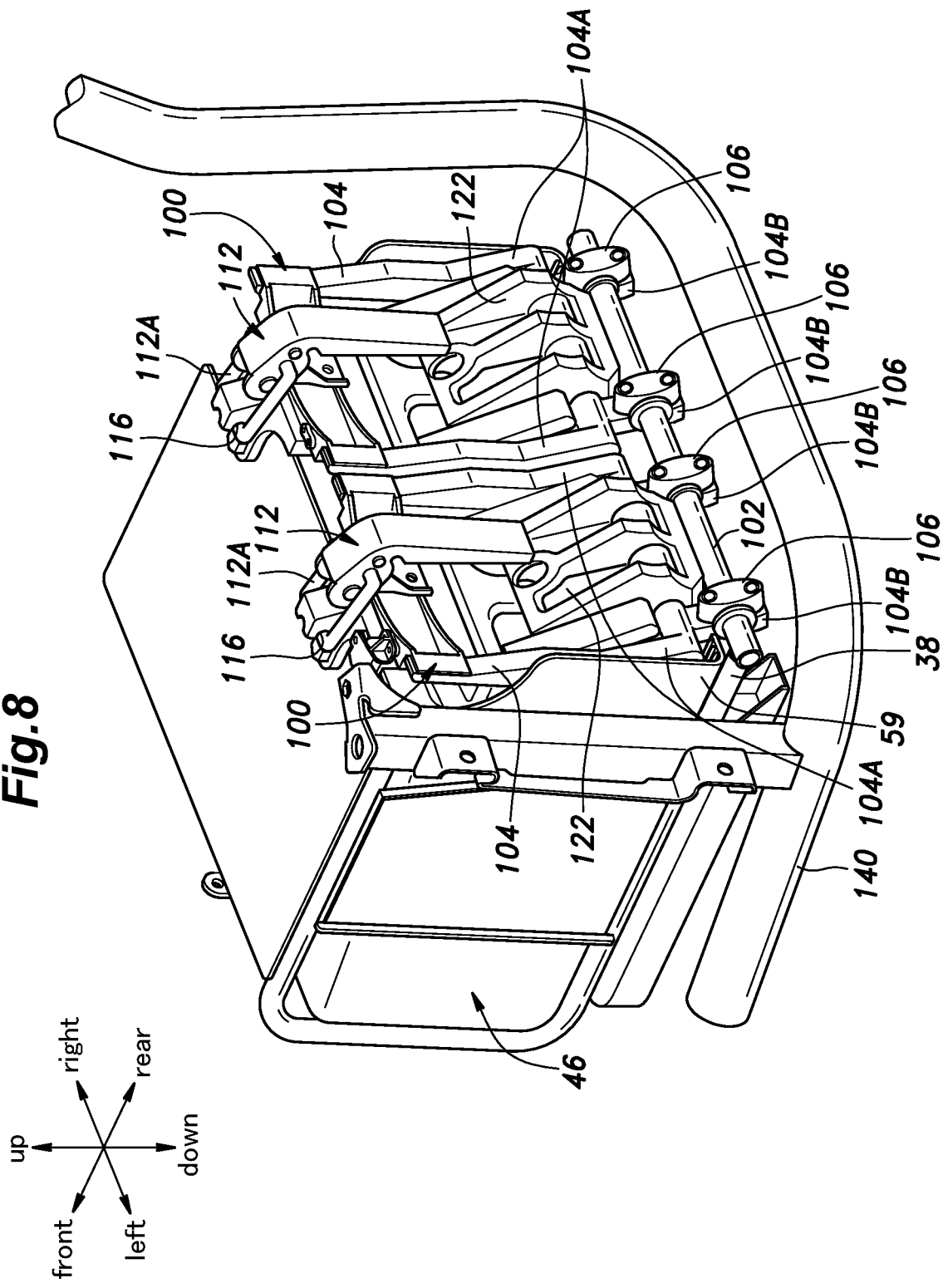
FIG. 8 is a perspective view of a battery receiving device according to another embodiment of the present embodiment with a lid in the closed state.

As shown in FIGS. 5 and 7, the connecting plate 76 is provided with a cylinder lock 82 serving as a lid locking device that releasably locks the lid 70 to the battery receiving member 46 in the closed position. A lock piece 84 is rotatably attached to the cylinder lock 82 so as to retain or lock the lid 70 in the closed position in a releasable manner when the lock piece 84 is rotated by the cylinder lock 82 into an engaging slot 86 formed in the intermediate plate 36 while the lid 70 is in the closed position. FIG. 7A shows an unlocked state in which the lock piece 84 is removed from the engaging slot 86 (see FIGS. 3 and 5), and FIG. 7B shows a locked state in which the lock piece 84 is engaged by (received in) the engaging slot 86 (FIGS. 3 and 5).

An abutting member 90 made of a rubber projection is attached to the second portion 75B of each leg portion 75 via a mounting base 88 so as to face the battery receiving member 46 in the rotational direction of the lid 70. Each abutting member 90 resiliently abuts against the outer surface of the battery pack 200 received in the corresponding battery receiving portion 48 in the direction along which the battery pack 200 is moved into and out of the battery receiving portion 48 when the lid 70 is in the closed position for closing the opening 60.

Thus, the battery pack 200 is prevented from falling out of the battery receiving portion 48, and the rattling of the battery pack 200 in the battery receiving portion 48 due to vibrations or the like is prevented.

As shown in FIG. 5, each second portion 75B is bent relative to the corresponding first portion 75A by a prescribed bend angle so that the upper surface of the abutting member 90 is located lower than an imaginary plane L containing the upper surface 98A of the lid side guide portion 98 when the lid 70 is in the open position.

A battery engaging portion 94 is attached to each pipe member 74 via a mounting base 92. In the closed position of the lid 70, the battery engaging portion 94 detachably engages a carrying handle portion 202 of the battery pack 200 received in the battery receiving portion 48, and retains the battery pack 200 to the lid 70 which is in the closed position. This engagement also prevents the battery pack 200 from rattling in the battery receiving portion 48 due to vibrations or the like.

The battery pack 200 is pulled out from the battery receiving portion 48 toward the rear of the vehicle body 12 when the battery pack 200 is required to be charged.

When placing the battery pack 200 into the battery receiving device 30, as shown in FIGS. 3 and 5, with the lid 70 in the open position, the battery pack 200 is first placed on the lid side guide portion 98 in the upright position, and is laid backward as the battery pack 200 is pushed and slides forward on the upper surface 98A of the lid side guide portion 98 so that the battery pack 200 advances into the battery receiving portion 48 from the opening 60.

As shown in FIG. 5, when the lid 70 is in the open position, and the opening 60 is exposed, since the second portions 75B are bent downward with respect to the corresponding first portions 75A as discussed earlier, the upper surface of each abutting member 90 is located below the imaginary plane L containing the upper surface 98A of the lid side guide portion 98. Therefore, when the battery pack 200 is put into or taken out of the battery receiving portion 48 with the lid 70 in the open position, the abutting members 90 are prevented from interfering with the battery pack 200.

Thereby, the battery pack 200 can be put into and taken out of the battery receiving portion 48 in a smooth and efficient manner without being obstructed by the abutting members 90.

At this time, the extension walls 59 and 61 serve to position the battery pack 200 with respect to the lateral direction as the battery pack 200 is about to be put into the battery receiving portion 48, and guide the battery pack 200 with respect to the lateral direction as the battery pack 200 advances into the battery receiving portion 48. Thus, the loading of the battery pack 200 can be performed with an improved efficiency.

The battery pack 200 slides over the upper surface 66A of the housing portion side guide portion 66 when advancing into the battery receiving portion 48.

In an early stage of loading the battery pack 200, the battery pack 200 is supported on the upper surface 98A of the lid side guide portion 98 of the lid 70 in the open position so that the time period during which the user (operator) is required to support the battery pack 200 against the gravity is reduced. In addition, since the upper surface 98A of the lid side guide portion 98 is inclined, the work involved in laying down the battery pack 200 at the time of loading can be easily performed without requiring a large force.

The rear end portion 66B of the receiving portion side guide portion 66 and the front end portion 98B of the lid side guide portion 98 overlap each other in the direction along which the battery pack 200 is put into and taken out of the battery receiving portion 48 so that the movement of the battery pack 200 from the lid side guide portion 98 to the receiving portion side guide portion 66 can be performed with continuity in a smooth manner. Furthermore, since the upper surface 66A of the rear end portion 66B and the upper surface 98A of the front end portion 98B are continuous in the direction of the movement of the battery pack 200 without any vertical step, the movement of the battery pack 200 from the lid side guide portion 98 to the receiving portion side guide portion 66 can be performed with a favorable continuity in a particularly smooth manner.

Further, since the ceiling surface 58 is inclined upward from the inner part of the battery receiving portion 48 toward the opening 60 along the direction of the inward and outward movement of the battery pack 200, the loading of the battery pack 200 can be performed in an efficient manner without being obstructed by the ceiling portion of the battery receiving member 46. Further, since the part of the bottom surface 50 adjoining the opening 60 forms a shelf surface that is open upward, the loading of the battery pack 200 can be performed in an efficient manner without being obstructed by the ceiling of the battery receiving member 46.

As a result, the loading of the battery pack 200 into the battery receiving portion 48 can be performed in an efficient manner without causing a large burden to the body of the user. Further, since the lid 70 itself functions as a tray for supporting the battery pack 200, the structure is simplified.

Once the battery pack 200 is completely received in the battery receiving portion 48, the lid 70 is rotated to the closed position, and the lock piece 84 actuated by the cylinder lock 82 is engaged by the engaging slot 86. As a result, the lid 70 is fixed (latched) in the closed position, and the lid 70 is prevented from opening inadvertently so that the battery pack 200 is prevented from accidentally falling off.

Since the two pipe members 74 each provided for the corresponding battery receiving portion 48 are connected to each other by the connecting plate 76, the two pipe members 74 are opened and closed (with the lid 70) by a single operation. Further, since the lock piece 84 is provided on the connecting plate 76, fixing the lid 70 including the two pipe members 74 at the closed position can also be performed with a single operation.

At the same time as the lid 70 is fixed in the closed position, the abutting members 90 resiliently contact the outer surface of the battery pack 200 in the direction along which the battery pack 200 is put into and taken out of the battery receiving portion 48. As a result, the battery pack 200 is prevented from falling out of the battery receiving portion 48, and is prevented from rattling in the battery receiving portion 48 due to vibrations.

Once the battery engaging portion 94 engages the carrying handle portion 202 of the battery pack 200, the battery pack 200 is fixedly engaged by the lid 70 in the closed position so that the battery pack 200 is prevented from rattling due to vibrations, and is retained in the battery receiving portion 48 in a reliable manner.

The removal of the battery pack 200 can be performed by reversing the procedure for loading the battery pack 200 discussed above. At the time of removing the battery pack 200, the battery pack 200 can be pulled out onto the lid side guide portion 98 of the lid 70 in the open position so that the removal of the battery pack 200 can be performed in an efficient manner without causing a great burden on the body of the user.

Further, the receiving portion side guide portion 66 extends substantially horizontally, and the battery pack 200 is put into and taken out of the battery receiving portion 48 by moving the battery pack 200 substantially horizontally while supported by the housing portion side guide portion 66 so that no large force is required as opposed to the case where the battery pack 200 is moved vertically by a hand when the battery pack 200 is being put into and taken out of the battery receiving portion 48. For this reason also, the battery pack 200 can be put into and taken out of the battery receiving portion 48 without causing any undue burden on the body of the user.

Another embodiment of the battery receiving device 30 according to the present invention is described in the following with reference to FIGS. 8 to 11. In FIGS. 8 to 11, parts corresponding to those shown FIGS. 2 to 6 are denoted by like reference numerals, and the description of such parts may be omitted in the following disclosure.

The pipe frames 38 support the two ends of a support shaft 102 extending along a lower edge of the opening 60 in the horizontal direction. The support shaft 102 supports first lid members 104 (main body portions) of a pair of lids 100 individually provided for the respective battery receiving portion 48 so as to be rotatable around a central axial line of the support shaft 102.

More specifically, each first lid member 104 has a gate-shaped (staple-shaped) frame structure, and includes a pair of leg portions 104 located on the right and left, and a pair of bearing extensions 104B extending from the free ends of the respective leg portions 104A in a laterally offset or staggered relationship to the corresponding leg portions 104A. Each bearing extension 104B is provided with a bearing cap member 106 that clamps the support shaft 102 from diametrical directions. Thereby, each first lid member 104 is rotatably attached to the support shaft 102.

The leg portions 104A and the bearing extension portions 104B are formed with lid side guide portions 107 and 108, respectively, on the side thereof facing the battery receiving portions 48 in the rotation thereof around the central axial line of the support shaft 102, each lid side guide portion 107, 108 consisting of ridges extending across the central axial line of the support shaft 102.

Figure 9:
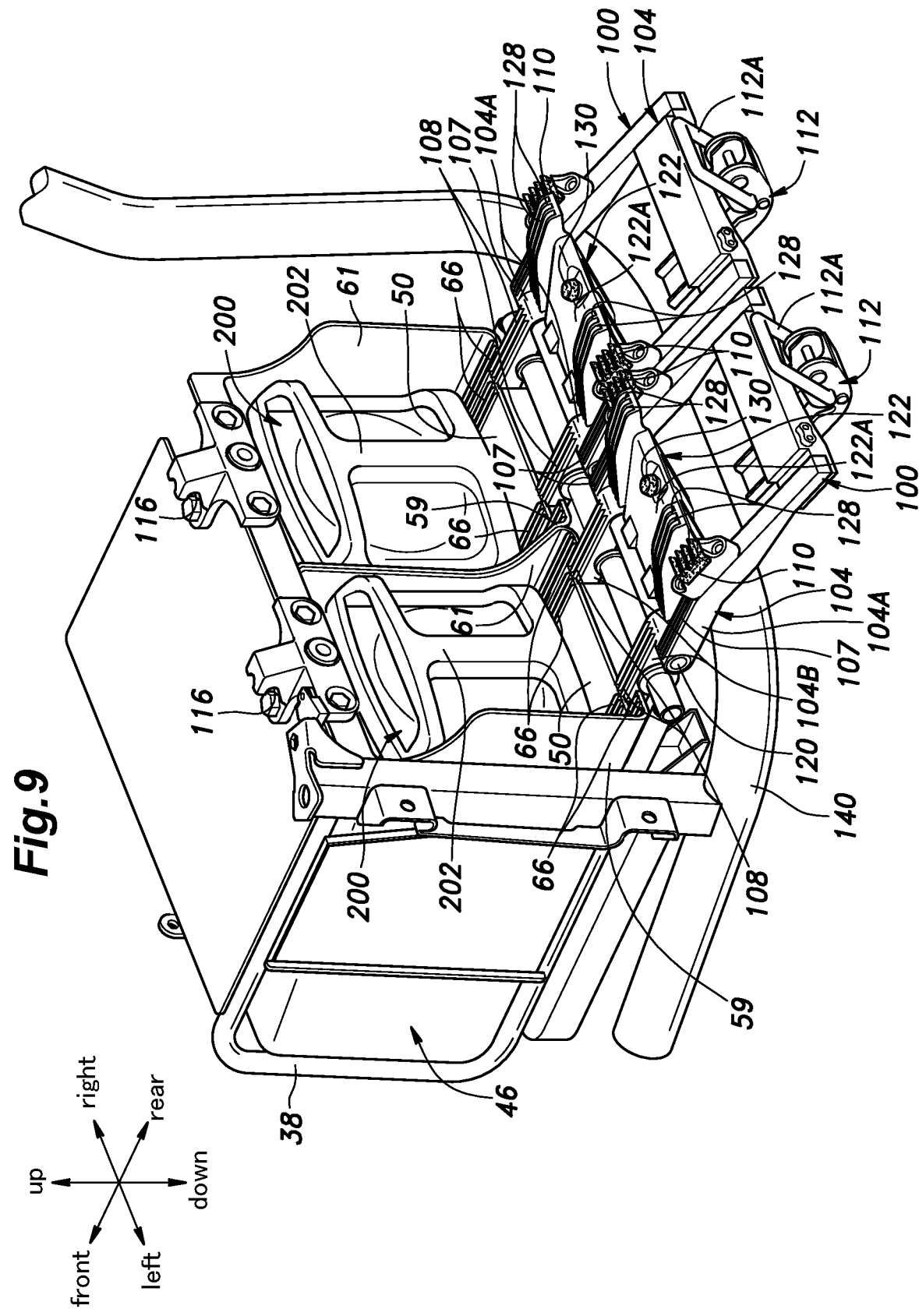
FIG. 9 is a perspective view of the battery receiving device of the other embodiment with the lid in the open state.

In other words, as shown in FIG. 9, each leg portion 104A and each bearing extension 104B have upper surfaces that are substantially at the same height as the bottom surface 50 of the battery receiving portion 48 when the lid 100 is in the open position. The lid side guide portions 107 and 108 are formed on this upper surface so as to extend in the direction (the fore and aft direction) along which the battery pack 200 is put into and taken out of the batter receiving portion 48 continuously with the corresponding receiving portion side guide portion 66.

The lid side guide portions 107 and 108 include mutually overlapping portions in the direction along which the battery pack 200 is put into and taken out of the battery receiving portion 48. Further, the lid side guide portion 108 and the receiving portion side guide portion 66 include mutually overlapping portions in the direction along which the battery pack 200 is put into and taken out of the battery receiving portion 48.

Figure 10:
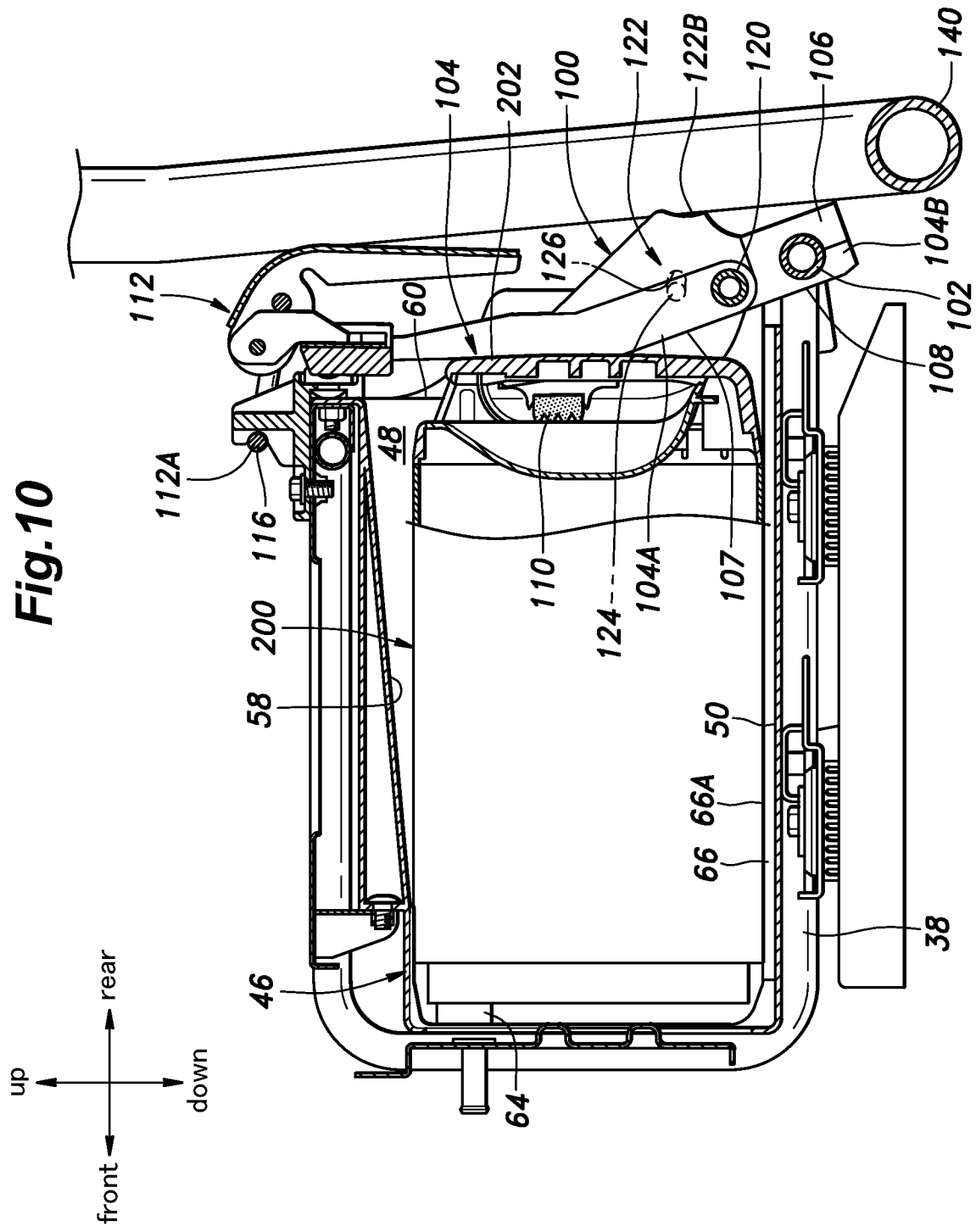
FIG. 10 is a vertical sectional view of the battery receiving device of the other embodiment with the lid in the closed state.

A plurality of rubber abutting members 110 are attached to a surface of the first lid member 104 facing the battery receiving member 46 in the rotational direction. As shown in FIG. 10, when the lid 70 closes the opening 60, the abutting members 110 resiliently abut against the outer surface of the battery pack 200 received in the battery receiving portion 48 in the direction of the in and out movement of the battery pack 200

Thus, the battery pack 200 is prevented from falling out of the battery receiving portion 48, and the rattling of the battery pack 200 in the battery receiving portion 48 due to vibrations or the like is prevented.

Each first lid member 104 is fitted with a toggle latch 112 that has a loop portion 112A configured to engage an engagement member 116 attached to the battery receiving member 46 to keep the first lid member 104 in the closed position by causing the abutting members 110 to abut against the outer surface of the battery pack 200.

Another support shaft 120 extending parallel to the support shaft 102 is attached to each of the first lid members 104 at a position farther away from the opening 60 than the support shaft 102. The support shaft 120 individually supports a corresponding second lid member (auxiliary portion) 122 so as to be rotatable around the central axial line thereof. Thus, each second lid members 122 is rotatable relative to the corresponding first lid member 104 around a central axial line of the support shaft 120 which is parallel to the support shaft 102.

The relative rotation between each first lid members 104 and the corresponding second lid member 122 is limited to a certain angular range owing to an engagement between a pin 124 provided on the first lid member 104 and a slot 126 (elongated groove) formed in the second lid member 122.

Figure 12:
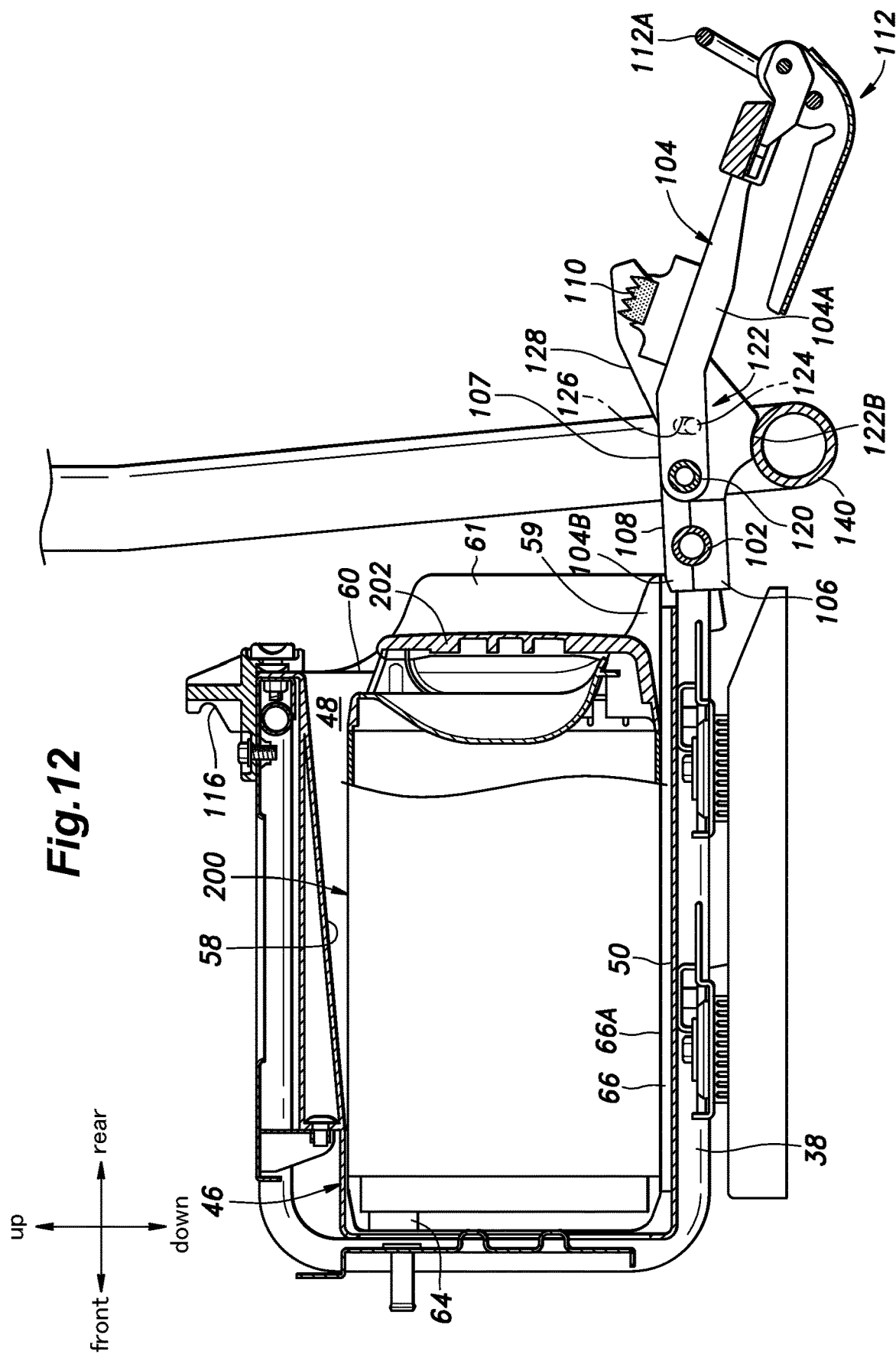
FIG. 12 is a vertical sectional view of the battery receiving device of the other embodiment with the lid in the open state.

Each second lid member 122 is provided with a pair of lid side guide portions 128 consisting of a pair of projections extending across the central axial line of the support shaft 120 and positioned on either side of the surface of the second lid member 122 facing the battery receiving member 46 with respect to the rotational direction of the second lid member 122. As shown in FIGS. 9 and 12, each lid side guide portion 128 is formed as protrusions projecting upward from a surface portion 122A of the second lid member 122 and extending in the direction (the fore and aft direction) along which the battery pack 200 is put into and taken out of the battery receiving portion 48 when the second lid member 122 is in the open position. The lid side guide portion 128 and the lid side guide portion 107 of the first lid member 104 include mutually overlapping portions in the direction along which the battery pack 200 is put into and taken out of the battery receiving portion 48.

To the surface portion 122A of each second lid member 122 is attached an abutting member 130 made of a rubber projection that resiliently abuts against the carrying handle portion 202 of the battery pack 200 received in the battery receiving member 46 when the lid 70 is in the open position. By the resilient contact of the abutting member 130 with the carrying handle portion 202, rattling of the battery pack 200 in the battery receiving portion 48 due to vibrations or the like is prevented.

As shown in FIG. 12, the open position of each second lid member 122 can be definitely defined by the prevention of the downward rotation (the clockwise rotation as viewed in FIGS. 10 to 12) of the second lid member 122 owing to the abutting of an arcuate portion 122B formed on the side of the second lid member 122 facing away from the battery receiving member 46 in the rotation of the second lid member 122 against the pipe frame 140 on the side of the vehicle body.

In this open position, each first lid member 104 rotates downward with respect to the corresponding second lid member 122 under its own weight until the pin 124 abuts against the lower end of the slot 126. By this rotation, the upper surface of the abutting member 110 is positioned below the upper surface of the lid side guide portion 128.

More specifically, each first lid member 104 and the corresponding second lid member 122 are connected to each other in such a manner that the abutting member 130 projects toward the side of the battery receiving member 46 more than the lid side guide portion 128 when the lid 100 is in the closed position, and the lid side guide portion 128 projects toward the side of the battery receiving member 46 more than the abutting member 130 when the lid 100 is in the open position.

Thus, in putting and taking the battery pack 200 into and out of the battery receiving portion 48 while the lid 100 is in the open position, the battery pack 200 is prevented from interfering with the abutting members 110. As a result, the battery pack 200 can be put into and taken out of the battery receiving portion 48 in an efficient and smooth manner without being obstructed by the abutting members 90.

When putting the battery pack 200 into the battery receiving portion 48, the lid 100 is placed in the open position as shown in FIGS. 9 and 12. Once the lower surface of the battery pack 200 has come into contact with the upper surface of the lid side guide portion 128, the lower surface of the battery pack 200 slides over the lid side guide portion 128 under an external force pushing the battery pack 200 toward the battery receiving portion 48, and the battery pack 200 moves downward along the inclination of the lid side guide portion 128. The battery pack 200 further slides over the lid side guide portions 107 and 180 and the receiving portion side guide portion 66 before finally received in the battery receiving portion 48.

Overlapping portions mutually overlapping in the direction of movement of the battery pack 200 into and out of the battery receiving portion 48 exist between the lid side guide portions 128 and 107, between the lid side guide portions 107 and 108, and between the lid side guide portion 108 and the receiving portion side guide portion 66. Therefore, the battery pack 200 can be passed from one guide portion to another in a smooth manner without being caught by anything along the way.

Figure 11:
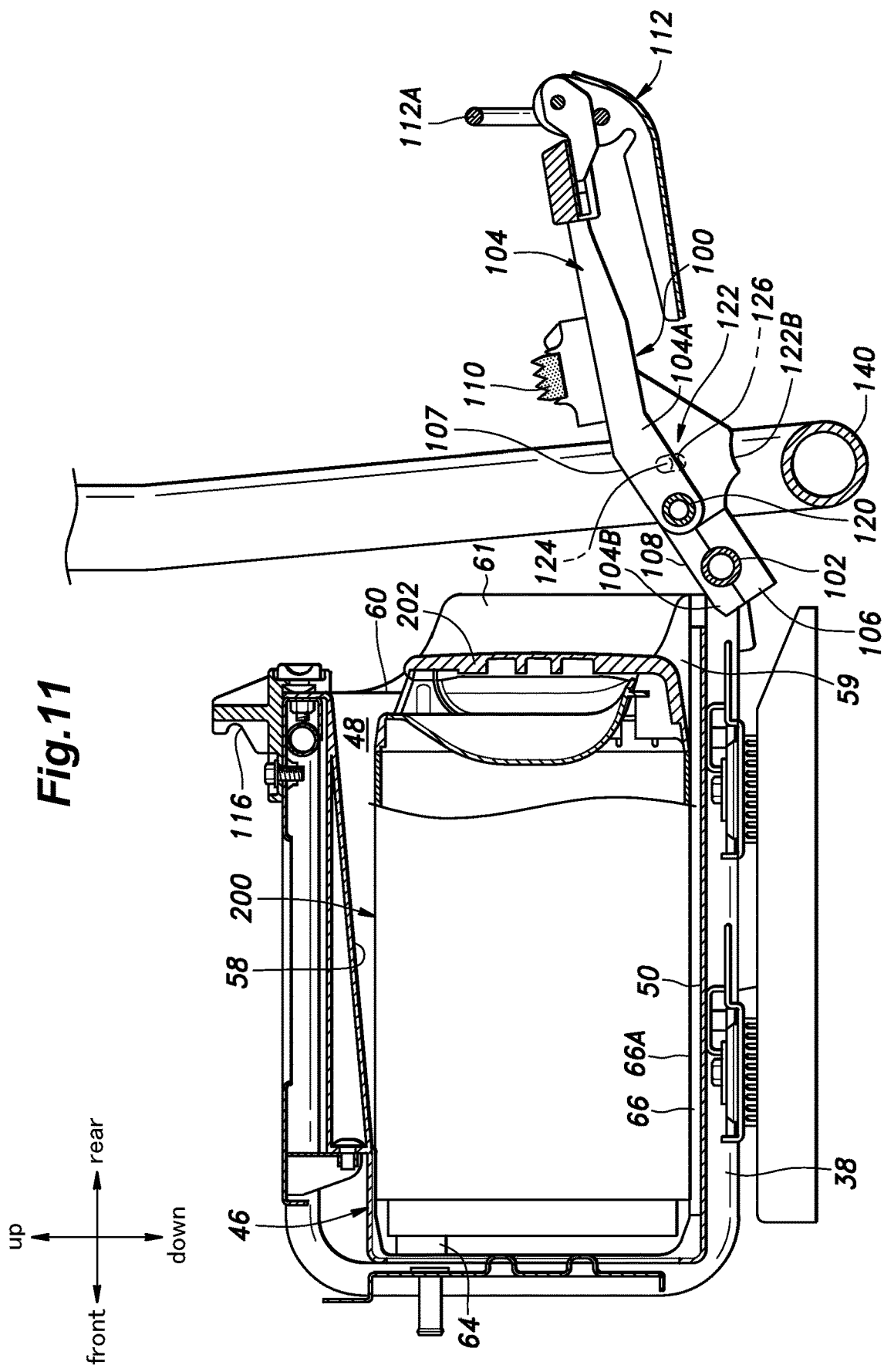
FIG. 11 is a vertical sectional view of the battery receiving device of the other embodiment with the lid in an intermediate state between the closed state and the open state.

The user may initiate the opening and closing operation of the lid 100 by operating the toggle latch 112. In the closing operation of the lid 100, by lifting the second lid member 122, the first lid member 104 and the second lid member 122 are caused to rotate relative to each other until the pin 124 comes into contact with the upper end of the slot 126 as shown in FIG. 11. Thus, the original state where the upper surface of the abutting member 110 is positioned above the upper surface of the lid side guide portion 128 is restored.

Figure 13:
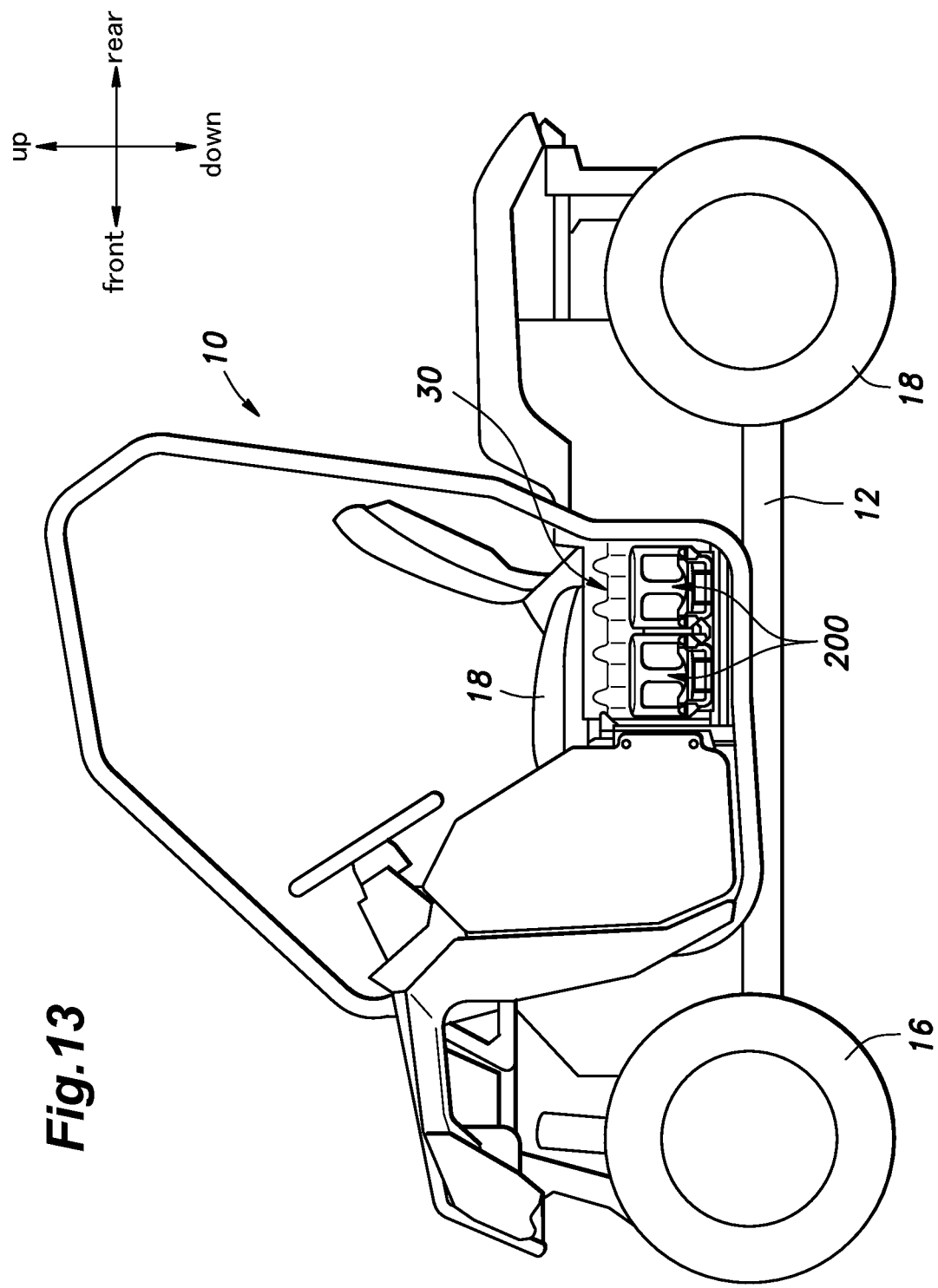
FIG. 13 is a side view an electric vehicle fitted with an article receiving device consisting of a battery receiving device according to another embodiment of the present invention.
Figure 14:
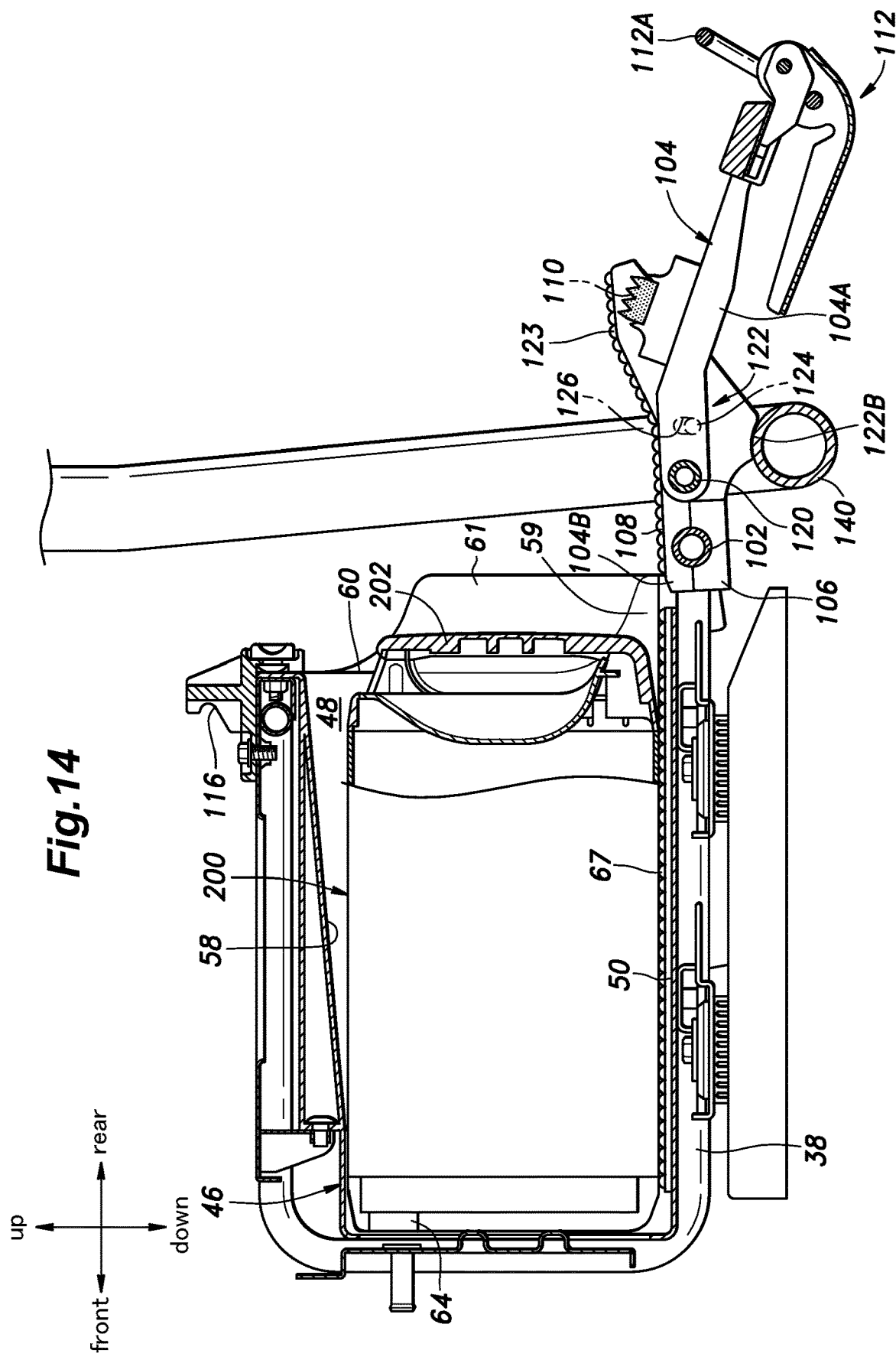
FIG. 14 is a vertical sectional view of a battery receiving device according to yet another embodiment of the present invention with a lid in the open state.

An electric vehicle according to another embodiment of the present invention is described in the following with reference to FIG. 13. In FIG. 13, parts corresponding to those shown FIG. 1 are denoted by like reference numerals, and the description of such parts may be omitted in the following disclosure.

In this embodiment, a battery receiving device 30 is provided under the driver's seat 24. The battery receiving device 30 is arranged so that the battery pack 200 can be put into and taken out from the side of the vehicle body 12, and is configured to receive a pair of battery packs 200 one behind another.

The present embodiment is otherwise similar to the preceding embodiment, and thus provides similar advantages as those of the preceding embodiment.

The present invention has been described in terms of specific embodiments, but is not limited by such embodiments, and can be modified in various ways without departing from the scope of the present invention.

The lid side guide portions 98 and 128 are not limited to those formed by ridges protruding from the lid 70 and the surface portions 97 and 122A of the second lid member 122. When the lid 70 and the second lid member 122 are formed as skeletal frames having no corresponding surface portions 97 and 122A, the lid 70 and the second lid member 122 may themselves serve as lid side guide portions. As shown in FIG. 4, the receiving portion side guide portions 66 and the lid side guide portions 128 may include a plurality of rolling members 67 and 129 arranged in the direction along which the battery pack 200 is put into and taken out of the receiving portion 48.

The battery receiving device 30 is not limited to be configured to receive a pair of battery packs 200, but may also be configured to receive three or more battery packs 200, or to receive only one battery pack 200. The bottom surface 50 of the battery receiving portion 48 may not necessarily define a horizontal surface, but may also be gently inclined downward from the opening 60 toward the front surface 56, preferably at an angle of 15 degrees or less with respect to the horizontal plane.

The electric vehicle is not limited to a pure electric vehicle, but may also consist of a hybrid vehicle using an internal combustion engine and an electric motor as prime movers. The battery receiving device 30 is not limited to the battery receiving device 30 configured to be mounted on an electric vehicle, but may also be configured to be installed in a charging station or the like. Further, the article receiving device according to the present invention is not limited to a battery receiving device 30, but may also be configured to receive and release a wide range of articles other than battery packs 200.

Further, all of the components shown in the above embodiments are not necessarily essential, and can be appropriately selected and omitted without departing from the gist of the present invention.

| REFERENCE NUMERALS | |
|---|---|
| 10: electric vehicle | 12: vehicle body |
| 14: door | 16: front wheel |
| 18: rear wheel | 20: battery chamber |
| 22: rear lid | 24: driver's seat |
| 30: battery receiving device (article receiving device) | |
| 32: mounting member | 34: end plate |
| 36: intermediate plate | 38: pipe frame |
| 40: cross member | 42: cross member |
| 44: cross member | |
| 46: battery receiving member (receiving member) | |
| 48: battery receiving portion (receiving portion) | |
| 49: bottom wall | 50: bottom surface |
| 50A: cutout | 51: side wall |
| 52: side surface | 53: side wall |
| 54: side surface | 55: side wall |
| 56: front surface | 57: ceiling wall |
| 58: ceiling surface | 59: extension wall |
| 60: opening | 61: extension wall |
| 62: terminal | 64: electric connector |
| 66: receiving portion side guide portion | 66A: upper surface |
| 66B: rear end portion | 68: cross member (engaging portion) |
| 70: lid | 72: hinge bracket |
| 74: pipe member | 75: leg portion |
| 75A: first portion | 75B: second portion |
| 76: connecting plate | 78: outer cover |
| 80: hinge shaft | 82: cylinder lock (lid locking device) |
| 84: lock piece (lid locking device) | |
| 86: engaging slot (lid locking device) | |
| 88: mounting base | 90: abutting member (abutting portion) |
| 92: mounting base | |
| 94: battery engaging portion (article engaging portion) | |

| REFERENCE NUMERALS -continued | |
|---|---|
| 96: guide member | 97: surface part |
| 98: lid side guide portion | 98A: upper surface |
| 98B: front end portion | 100: lid |
| 102: support shaft | |
| 104: first lid member (main body portion) | |
| 104A: leg portion | 104B: bearing extension portion |
| 106: bearing cap member | 107: lid side guide portion |
| 108: lid side guide portion | 110: abutting member (abutting portion) |
| 112: toggle latch | 112A: loop portion |
| 116: engagement member | 120: support shaft |
| 122: second lid member (auxiliary portion) | |
| 122A: surface portion | |
| 122B: arcuate portion | 124: pin |
| 126: slot | 128: lid side guide portion |
| 130: abutting member | 140: pipe frame (engaging portion) |
| 200: battery pack (article) | 202: carrying handle portion |
| L: imaginary plane | X: horizontal axial line |

The invention claimed is:

1. An article receiving device for receiving an article therein, comprising:
    a receiving portion configured to receive the article therein, and having an opening for passing the article into and out of the receiving portion; and
    a lid rotatable around an axial line extending horizontally along a lower part of the opening to selectively open and close the opening;
    wherein the lid is provided with a lid side guide portion extending across the axial line and toward a side of the receiving portion with respect to a rotational direction of the lid around the axial line,
    the article receiving device further comprises a lid locking device configured to releasably lock the lid in a closed position, and
    the lid is provided with an abutting portion that resiliently abuts against the article received in the receiving portion when the lid is in the closed position.

2. The article receiving device according to claim 1, further comprising an engaging portion configured to selectively retain the lid in an open position, the lid side guide portion having an upper surface which slopes downward toward the opening when the lid is in the open position.

3. The article receiving device according to claim 1, further comprising a receiving member that defines the receiving portion, and an engaging portion configured to selectively retain the lid in an open position,
    wherein the lid side guide portion includes a ridge extending in a direction along which the article is put into and taken out of the receiving portion when the lid is in the open position.

4. The article receiving device according to claim 3, wherein the lid has a surface portion from which the ridge projects.

5. The article receiving device according to claim 1, wherein the lid side guide portion includes a plurality of rolling members arranged in a direction along which the article is put into and taken out of the receiving portion.

6. The article receiving device according to claim 1, further comprising a receiving member that defines the receiving portion, the receiving member being provided with a receiving portion side guide portion formed so as to extend across the axial line.

7. The article receiving device according to claim 6, wherein the receiving portion side guide portion extends substantially horizontally.

8. The article receiving device according to claim 6, further comprising an engaging portion configured to selectively retain the lid in an open position, the lid side guide portion and the receiving portion side guide portion being provided with mutually overlapping portions when the lid is in an open position.

9. The article receiving device according to claim 1, further comprising an engaging portion configured to selectively retain the lid in an open position,
wherein the lid includes a first portion located on a base end part thereof and provided with a lid side guide portion, and a second portion located on a free end part thereof and provided with the abutting portion, the first portion and the second portion being bent relative to each other so that a free end of the abutting portion is located below an imaginary plane containing the upper surface of the lid side guide portion of the lid when the lid is in the closed position.

10. The article receiving device according to claim 1, further comprising an engaging portion configured to selectively retain the lid in an open position, wherein the lid includes a main body portion provided with the abutting portion and an auxiliary portion provided with the lid side guide portion and rotatable around an axial line parallel to the aforementioned axial line relative to the main body portion,
the main body portion and the auxiliary portion being connected to each other so that the abutting portion projects toward the receiving member more than the lid side guide portion when the lid is in the closed position, and the lid side guide portion projects toward the receiving member more than the abutting portion when the lid is in the open position.

11. The article receiving device according to claim 10, wherein the main body portion and the auxiliary portion are connected to each other by a pin provided on the main body portion and a slot provided in the auxiliary portion to receive the pin therein so that a relative rotation between the main body portion and the auxiliary portion is limited within a prescribed rotational angular range.

12. The article receiving device according to claim 1, wherein the lid is provided with an article engaging portion that detachably engages the article received in the receiving portion to secure the article to the lid when the lid is in the closed position.

13. The article receiving device according to claim 1, wherein the receiving portion includes a ceiling wall defining a ceiling surface of the receiving portion, the ceiling surface being inclined upward relative to a bottom surface of the receiving portion from a part of the receiving portion remote from the opening toward the opening in a direction along which the article is put into and taken out of the receiving portion.

14. The article receiving device according to claim 1, further comprising a pair of side walls forming a left and a right side surface of the receiving portion, and a pair of extension walls extending from the respective side walls to either side of the lid.

15. The article receiving device according to claim 1, wherein the article is a battery pack.

16. An electric vehicle fitted with the article receiving device according to claim 15.

* * * * *